United States Patent [19]

Yajima et al.

[11] Patent Number: 4,898,035

[45] Date of Patent: Feb. 6, 1990

[54] PRESSURE SENSOR HAVING SEALING MEMBER FOR SEALING HOUSING INTERIOR WITH RESPECT TO EXTERNAL SPACE

[75] Inventors: Yasuhito Yajima; Yasushi Watanabe, both of Nagoya, Japan

[73] Assignee: NGK Insulators, Ltd., Nagoya, Japan

[21] Appl. No.: 294,412

[22] Filed: Jan. 9, 1989

[30] Foreign Application Priority Data

Jan. 16, 1988 [JP] Japan .................................. 63-7124

[51] Int. Cl.$^4$ ............................ G01L 7/08; G01L 9/06
[52] U.S. Cl. ........................................ 73/727; 73/756; 338/4; 338/42
[58] Field of Search .................... 73/715, 728, 756; 338/42; 361/283; 336/30; 92/103 R, 103 SD; 403/30

[56] References Cited

U.S. PATENT DOCUMENTS 4,311,980  1/1982  Prudenziati ........................ 338/4
4,617,607  10/1986  Park et al. ........................... 73/724
4,670,733  6/1987  Bell ..................................... 338/42

FOREIGN PATENT DOCUMENTS 62-81036  5/1987  Japan .

OTHER PUBLICATIONS

Roberto Deli'Acqua et al., "High Pressure Thick Film Monolithic Sensors", SAE Report 860474, pp. 79–87.
Roberto Deli'Acqua et al., "Characteristics and Performances of Thick Film Pressure Sensors for Automotive Applications", SAE Report 820319, pp. 69–75.

Primary Examiner—Donald O. Woodiel
Attorney, Agent, or Firm—Arnold, White & Durkee

[57] ABSTRACT

A pressure sensor including a cylindrical metallic housing having an open end having an opening, a ceramic pressure sensing element having a ceramic diaphragm and fixedly accommodated within an open end portion of the metallic housing, and a strain detector associated with the ceramic diaphragm. The ceramic diaphragm is exposed at one of opposite major surfaces thereof to an external space through the opening of the metallic housing and is deformable in response to a pressure of a measurement fluid in the external space. An electrical output of the strain detector varies with an amount of deformation of the ceramic diaphragm, thereby representing the pressure of the fluid. The sensor further includes a metallic sealing member which is fluid-tightly bonded to a peripheral portion of the ceramic pressure sensing element with a bonding material, and which is fluid-tightly welded to the open end portion of the cylindrical metallic housing, so that the pressure sensing element is fluid-tightly secured to the metallic housing through the metallic sealing member, whereby an interior of the metallic housing is sealed with respect the external space.

11 Claims, 4 Drawing Sheets

PRESSURE SENSOR HAVING SEALING MEMBER FOR SEALING HOUSING INTERIOR WITH RESPECT TO EXTERNAL SPACE

BACKGROUND OF THE INVENTION

1. Field of the Invention

The present invention relates in general to a ceramic pressure sensor, and more particularly to a ceramic pressure sensor suitably used for measuring the pressure of a fluid as in the cylinder bore of an internal combustion engine.

2. Discussion of the Prior Art

There is known a pessure sensor of a type in which strain detecting means is provided on a substrate such as a diaphragm which is deformable in response to a pressure applied thereof. The deformation of the substrate is detected as a variation in the electrical output of the strain detecting means, which represents the pressure applied to the substrate. Several forms of such a pressure sensor using a ceramic diaphragm and capable of operating in high temperature environments have been recently proposed, as disclosed in SAE Reports 820319 and 860474.

In the pressure sensor of the type using such a ceramic diaphragm, the diaphragm is disposed such that one of the opposite surfaces of the diaphragm is generally exposed directly to a measurement fluid existing in the external space, so that the pressure of the measurement fluid acts on the exposed surface of the diaphragm.

Also, the pressure sensor of the type indicated above is adapted such that a pressure sensing element including the ceramic diaphragm is fixedly accommodated within a cylindrical metallic housing. The pressure sensing element and the metallic housing are sealed by suitable sealing means, with respect to each other, so that the external measurement fluid in the external space will not enter the interior of the housing, in order to avoid an adverse influence of the measurement fluid introduced in the housing, on the operating response and measuring accuracy of the sensor.

Where the pressure sensor is used to measure the pressure within the cylinder bore of an internal combustion engine, for example, the pressure sensor is installed in a mounting hole formed in the lateral end portion of the cylinder head of a cylinder block of the engine, such that the sensor is exposed to a high-temperature atmosphere within the combustion chamber of the engine, through a suitable fluid passage communicating with the sensor and the combustion chamber, as disclosed in laid-open Publication No. 62-81036 of Japanese unexamined Utility Model Application. Therefore, the sealing means for establishing fluid tightness between the metallic housing and the pressure sensing element accommodated therein is exposed to a high temperature of the atmosphere from the combustion chamber. Thus, it has been practically impossible to use, as the sealing means, 0-rings made of resin or rubber materials which usually have high sealing capability.

In the light of the above, it is necessary to use a metallic 0-ring for sealing between the pressure sensing element and the metallic housing, where the sensing element is exposed to a high-temperature measurement fluid. Alternatively, a metallic washer is interposed between and in metallic contact with the housing and the sensing element, such that no gap is left between the two members. However, the use of such a metallic 0-ring or washer results in complicating the sealing structure. Moreover, the metallic 0-ring or washer is not capable of establishing a sufficient degree of fluid tightness of the metallic housing, where the pressure of the measurement fluid in the external space (e.g., combustion chamber of an internal combustion engine) is 100 atmospheric pressures or higher, for example. Accordingly, the use of the metallic seals suffers from various undesirable results. For example, where the pressure sensor is used to detect the pressure within a cylinder bore of an internal combustion engine operating under a high load condition, combustion gases and/or engine oils in the cylinder are forced into the interior of the housing of the pressure sensor, through the metallic seal. As a result, the strain detecting portion of the sensing element is stained and deteriorated, whereby the operating response and measuring accuracy of the sensor are adversely influenced.

SUMMARY OF THE INVENTION

It is therefore an object of the present invention to provide a pessure sensor constructed so as to maintain a sufficient degree of fluid tightness between the housing and the pressure sensing element, even under operating conditions involving high temperature and pressure.

Another object of the invention is to provide such a pressure sensor having excellent sealing capability, which sensor is simple in construction and easy and economical to manufacture.

The above objects may be achieved according to the principle of the present invention, which provides a pressure sensor including a cylindrical metallic housing having an open end having an opening, a ceramic pressure sensing element having a ceramic diaphragm and fixedly accommodated within an open end portion of the metallic housing, and strain detecting means associated with the ceramic diaphragm, the ceramic diaphragm being exposed at one of opposite major surfaces thereof to an external space through the opening of the metallic housing and deformable in response to a pressure of a measurement fluid in the external space, an electrical output of the strain detecting means varying with an amount of deformation of the ceramic diaphragm, thereby representing the pressure of the measurement fluid, the pressure sensor being characterized in that a metallic sealing member is fluid-tightly bonded to a peripheral portion of the ceramic pessure sensing element with a bonding material, and is fluid-tightly welded to the open end portion of the cylindrical metallic housing, so that the pressure sensing element is fluid-tightly secured to the metallic housing through the metallic sealing member, such that an interior of the metallic housing is sealed with respect to the external space.

In the pressure sensor of the present invention constructed as described above, the metallic sealing member is disposed between the peripheral portion of the ceramic pressure sensor and the open end portion of the cylindrical metallic housing, such that the sealing member is fluid-tightly bonded to the ceramic pressure sensing element with a suitable bonding material such as a glass or brazing material, and is at the same time fluid-tightly welded to the metallic housing. In this simple sealing arrangement, the pressure sensing element is fluid-tightly secured to the metallic housing through the metallic sealing member, such that the interior of the housing is effectively fluid-tightly shielded from a measurement fluid existing in the external space. Further, unlike the conventionally used metallic 0-ring or washer which is simply interposed between or held in contact with the housing and the sensing element, the metallic sealing member is bonded or brazed and welded to the housing and sensing element. Namely, the metallic housing and the sensing element are secured to each other by the bonding material such as a glass or brazing material and by welding, whereby the fluid-tightness between these two members is maintained at a comparatively high level, even where the pressure sensor is exposed to the measurement fluid having high temperature and pressure.

For the reasons stated above, the metallic sealing member enables the instant pressure sensor to measure the pressure of the measurement fluid, with a minimum degree of measuring error and without deterioration of the operating response, even when the measurement fluid has high temperature and/or pressure, like the combustion gases within an internal combustion engine. Hence, the instant pressure sensor may be suitably used for measuring the pressure within an internal combustion engine.

It is also noted that the ceramic pressure sensing element and the cylindrical metallic housing are not merely fluid-tightly bonded together by a glass or brazing material, according to the present invention. Instead, the fluid-tight fixing of the sensing element to the metallic housing is effected by separate bonding and welding via the metallic sealing member. In othe words, the fluid-tight bonding of the sealing member to the sensing element with a glass or brazing material can be conducted separately from or independently of the fluid-tight welding of the sealing member to the metallic housing to fix the sensing element to the metallic housing. Accordingly, an adjustment to rectify the sensing element for eliminating an adverse influence of the high-temperature bonding or brazing operation can be accomplished before the sensing element is secured by welding to the metallic housing via the sealing member. This means high manufacturing flexibility of the instant pressure sensor.

More specifically, the resistance values of electrical resistors used as the strain detecting means on the ceramic diaphragm of the sensing element tend to be changed from the nominal values, due to the heat applied to the resistors during the bonding or brazing of the sensing element to the metallic housing which is effected at an elevated temperature. In the conventional pressure sensor, the trimming of the resistors of the strain detecting means to re-adjust the resistance values of the resistors can only be achieved through the other opening at the end of the metallic housing remote from the sensing element, since the sensing element has been fixedly accommodated within the metallic housing by the bonding or brazing operation. This trimming procedure is extremely difficult to achieve.

The metallic sealing member may be a metallic annular plate member having an opening formed therethrough. In this case, the ceramic diaphragm is exposed to the external space through the opening of the annular plate member, and the annular plate member is bonded to a peripheral portion of the ceramic diaphragm and welded to an end face of the open end of the metallic housing.

Alternatively, the sealing member may be a metallic member which includes a cylindrical portion disposed outwardly of the ceramic sensing element, and a flange portion which extends radially outwardly from the cylindrical portion. In this case, the cylindrical portion is bonded to the sensing element while the flange portion is welded to an end face of the open end of the metallic housing. The cylindrical portion may consists of a double-walled structure, so that the double-walled structure may accommodate a difference in thermal expansion coefficient between the metallic housing and the ceramic pressure sensing element. The cylindrical portion may be bonded to the ceramic sensing element via at least one metal layer, for example a metallized layer and a metal plating layer.

The pressure sensor may further comprise a baffling structure disposed adjacent to the ceramic diaphragm of the ceramic sensing element. In this case, the diaphragm is exposed to the external space through the baffling structure. The baffling structure includes at least one baffle plate having a plurality of apertures formed therethrough. Where the baffling structure is provided, a covering cap having an opening is secured to the open end portion of the metallic housing, such that the baffling structure is fixedly accommodated in the covering cap. The ceramic diaphragm is exposed to the external space through the opening of the covering cap, as well as through the baffling structure.

BRIEF DESCRIPTION OF THE DRAWINGS

The foregoing and other objects, features and advantages of the present invention will be better understood by reading the following detailed description of presently preferred embodiment of the invention, when considered in conjunction with the accompanying drawings, in which:

FIGS. 1(a) through FIGS. 5(a) are fragmentary elevational views in longitudinal cross section of different embodiments of a pressure sensor of the present invention, each showing an assembly of a ceramic pressure sensing element and a sealing member, prior to fluid-tight welding to a metallic housing; and FIGS. 1(b) through 5(b) are fragmentary elevational views in longitudinal cross section of the pressure sensors of FIGS. 1(a) through 1(b), each showing the assembly of the sensing element and sealing member which has been fluid-tightly welded to the metallic housing.

DETAILED DESCRIPTION OF THE PREFERRED EMBODIMENTS

Figure 1A:
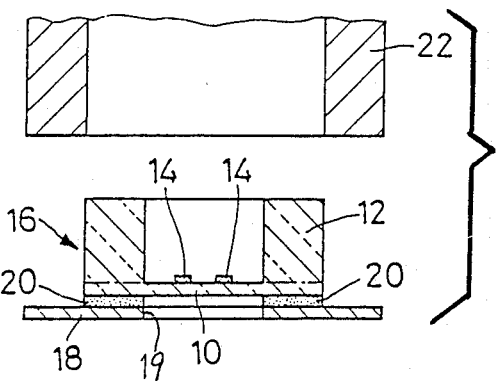
Figure 1B:
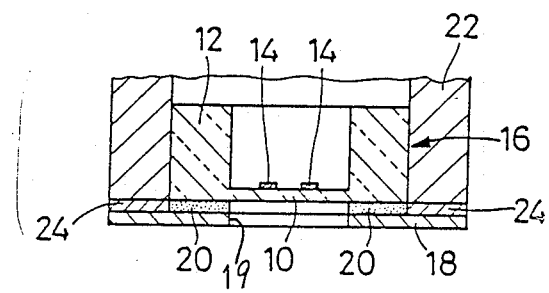

Referring first to FIGS. 1(a) and 1(b), reference numeral 10 designates a ceramic diaphragm of a pressure sensor according to one embodiment of the invention, which diaphragm is deformable in response to a pressure applied thereto. The ceramic diaphragm 10 is a round sheet or film member formed of a ceramic material. The ceramic diaphragm 10 is secured at its peripheral portion to an end face of a cylindrical ceramic support body 12, whereby the diaphragm 10 is fixedly positioned.

The ceramic diaphragm 10 and the cylindrical ceramic support body 12 are formed as an integral body, by a known technique using a suitable known ceramic material such as alumina, zirconia, mullite or silicon nitride. An unfired formed mass of the selected ceramic material is fired into the ceramic structure 10, 12. Although the diaphragm 10 and support body 12 may be formed and fired separately and then joined togehter into the integral structure 10, 12 by a glass or other bonding material, it is desirable that an integrally formed ceramic mass be fired into the ceramic body 10, 12, as proposed in copending U.S. patent application Ser. No. 07/197,312 (filed May 23, 1988), from the standpoint of heat and pressure resistances, and sensing accuracy of the pressure sensor.

On the inner major surface of the ceramic diaphragm 10 at which the diaphragm 10 and the support body 12 are joined together, there are formed a plurality of electrical resistors 14 and electrically conductive strips (not shown) which connect the resistors 14 in a bridge configuration or arrangement, as known in the art, so as to provide strain detecting means in the form of a Wheatstone bridge circuit, for example. These resistors 14 and the conductive strips are formed by printing or other techniques, by using suitable electrically resistive and conductive materials, before or after the diaphragm 10 is fired. Thus, there is obtained a ceramic pressure sensing element 16 wherein the cylindrical ceramic support body 12 is closed at its one end by the diaphragm 10 carrying the resistors 14 formed thereon.

In the pressure sensing element 16 constructed as described above, the resistance values of the resistors 14 on the diaphragm 10 decrease or increase with an amount of deformation or strain of the ceramic diaphragm 10 which occurs when the diaphragm 10 is stressed. The electrical output of the bridge circuit including the resistors 14 represents a pressure or stress acting on the diaphragm 10, and is fed to an external device, to measure the pressure. While the resistors 14 and the conductive strips may be formed of any materials used in the art, it is preferable particularly for the resistors 14, to use a mixture which consists substantially of a selected electrically conductive component having excellent high-temperature characteristics, and a selected dielectric component consisting of a glass or ceramic material, as disclosed in copending U.S. patent application Ser. No. 07/198,085 (filed May 24, 1988), so that the bridge circuit is highly durable in high-temperature environments.

A metallic sealing member in the form of an annular disk 18 having an opening 19 is fluid-tightly secured at its radially inner portion to the radially outer or peripheral portion of the bottom wall (outer surface of the diaphragm 10) of the sensing element 16, via an annular bonding layer 20 formed of a glass or brazing material, such that the central part of the outer surface of the bottom wall (diaphragm 10) is exposed to the ambient atmosphere outside the sensing element 16. The fluid-tight bonding of the metallic annular disk 18 to the sensing element 16 by a glass or brazing material may be easily effected in an ordinary manner. Namely, a suitable glass or brazing material is placed between the joining surfaces of the annular disk 18 and the sensing element 16, and the assembly of the element 16 and disk 18 is introduced into a suitable furnace for heating the glass or brazing material to a suitable temperature. While this heating may adversely influence on the sensing element 16, for example, a variation in the resistance value of the resistors 14, the resistors 14 are trimmed or otherwise adjusted after the fluid-tight bonding of the annular disk 18 to the sensing element 16 and prior to the following fluid-tight welding of the assembly 16, 18 to a cylindrical metallic housing 22.

The assembly 16, 18 of the fluid-tightly bonded sensing element 16 and the annular sealing disk 18 is fluid-tightly welded at the peripheral portion of the disk 18 to the open end face of the cylindrical metallic housing 22, such that the sensing element 16 is accommodated within the open end portion of the housing 22. Described more specifically, the peripheral portion of the inner surface of the annular disk 18 is fluid-tightly welded to the relevant end face of the metallic housing 22, by a suitable method such as resistance welding, plasma welding or brazing, while the mating surfaces are held in abutment with each other. Thus, the interior of the metallic housing 22 is fluid-tightly sealed with respect to the external space. Reference numeral 24 denotes an annular welding layer formed between the metallic annular disk 18 and the metallic housing 22. The diaphragm 10 of the sensing element 16 fixedly accommodated within the housing 22 is exposed at its outer surface to the external space, through the central opening 19 formed through the annular disk 18.

According to the assembling procedure described above, the pressure sensing element 16 is accommodated, fixed and sealed with utmost ease within the metallic housing 22, by simply practicing an ordinary welding operation between the annular disk 18 and the housing 22. Further, since the gas tightness between the annular disk 18 and the sensing element 16 is established by the bonding layer 20 of a glass or brazing material prior to the assembling of the sensing element 16 to the housing 22, the interior of the housing 22 is excellently sealed with respect to the external space. Consequently, the interior of the pressure sensing element 16 is effectively protected against exposure to the external measurement atmosphere (i.e., atmosphere whose pressure is measured) or external pollutants, which may lower the detecting accuracy and operating response of the pressure sensor.

Figure 2A:
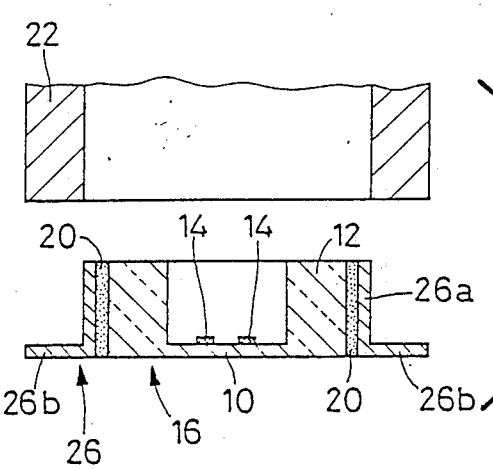
Figure 2B:
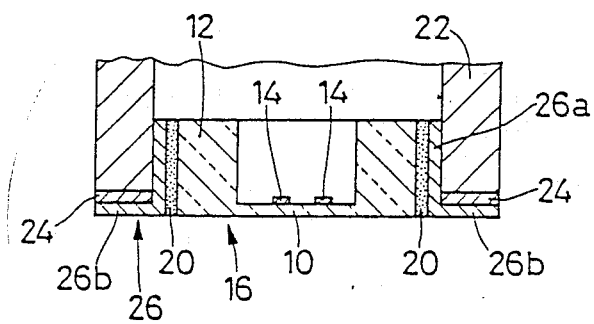

Referring to FIGS. 2(a) and 2(b), there is illustrated a second embodiment of the pressure sensor of the invention, which is characterized by the use of a metallic sealing member 26 in place of the metallic annular sealing disk 18 of the first embodiment. The sealing member 26 consists of a cylindrical portion 26a which has substantially the same height as the ceramic support body 12 of the sensing element 16, and a flange portion 26b which extends radially outwardly from one end of the cylindrical portion 26a. As indicated in FIG. 2(a), the inner circumferential surface of the cylindrical portion 26a is fluid-tightly bonded to the outer circumferential surface of the cylindrical ceramic support body 12, by the fluid-tight bonding layer 20 formed of a glass or brazing material. Thus, the sensing element 16 and the sealing member 26 are fluid-tightly bonded to each other into an integral assembly. This assembly 16, 26 is secured, at the flange portion 26b of the sealing member 26, to the metallic housing 22, such that the sensing element 16 and the cylindrical portion 26a of the sealing member 26 are fixedly accommodated within the end portion of the housing 22, as shown in FIG. 2(b). More particularly, the flange portion 26b and the open end face of the housing 22 are gas-tightly welded as indicated at 24.

Figure 3A:
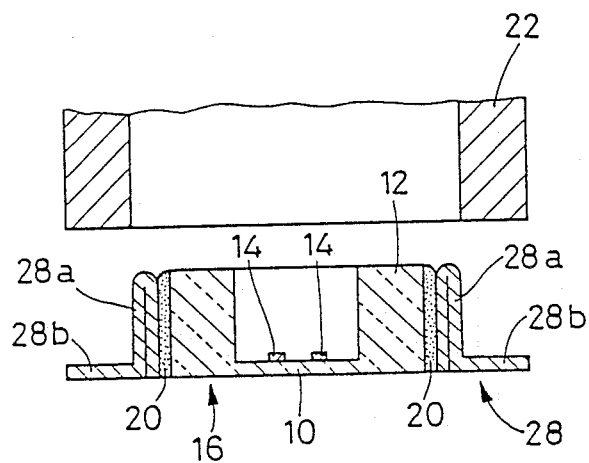
Figure 3B:
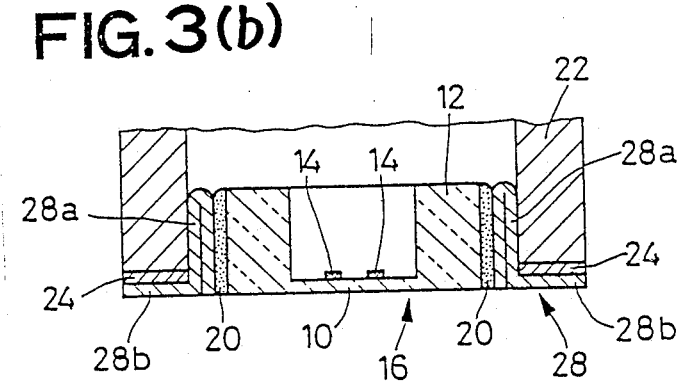

A further embodiment of the pressure sensor of the invention is illustrated in FIGS. 3(a) and 3(b). This pressure sensor uses a modified metallic sealing member 28. Unlike the sealing member 26 of FIGS. 2(a) and 2(b), this sealing member 28 is characterized by a double-walled cylindrical portion 28a which consists of two walls formed by bending. The sensing element 16 is fluid-tightly welded to the housing 22 via the sealing member 28, as shown in FIG. 3(b). The double-walled structure of the cylindrical portion 28a serves to accommodate a difference in coefficient of thermal expansion between the sensing element 16 and the metallic housing 22. That is, an expansion of the housing 22 may be accommodated by the elastic property of the double-walled structure of the cylindrical portion 28a.

Figure 4A:
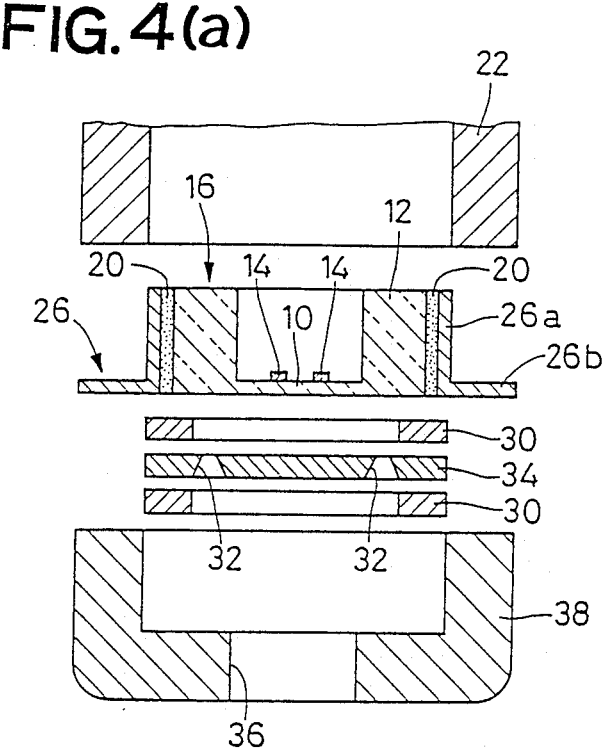
Figure 4B:
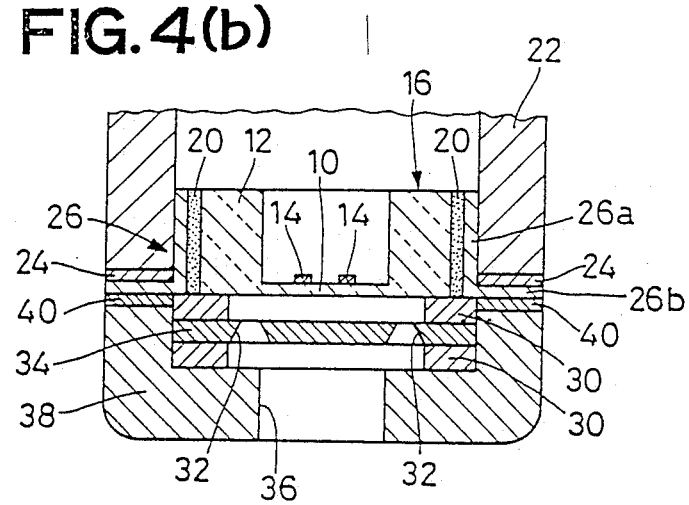

Reference is now made to FIGS. 4(a) and 4(b), which show a further embodiment of the pressure sensor of the invention, wherein the sensing element 16 as used in the embodiment of FIGS. 2(a) and 2(b) is provided with a buffling structure which consists of a round metallic baffle plate 34 disposed between a pair of metallic spacer rings 30, 30. The baffle plate 34 has a plurality of apertures 32 formed through a radially outer portion thereof. The apertures 32 are arranged along a circle concentric with the baffle plate 34. The baffling structure protects the deformable portion of the diaphragm 10 of the sensing element 16 from direct exposure to the external space. Thus, the baffling structure effectively prevents the deformation or strain of the diaphragm 10 due to a sudden change in the temperature of the external measurement fluid existing in the external space.

The baffling structure consisting of the spacer rings 30 and baffle plate 34 are fixedly positioned within a cylindrical, relatively shallow metallic covering cap 38 which has an opening 36 of a suitable size formed in its bottom wall. The covering cap 38 is welded at its open end to the lower surface of the flange portion 26b of the metallic sealing member 26, via an annular welding layer 40, as shown in FIG. 4(b).

In the present pressure sensor, the outer surface of the diaphragm 10 of the sensing element 16 communicates with the external space, i.e., external measurement fluid, through the baffling structure provided by the spacer rings 30 and baffle plate 34. Consequently, the outer surface of the diaphragm 10 is protected from an influence of a sudden or abrupt change in the temperature of the measurement fluid, whereby an error in the measurement of the pressure of the external fluid resulting from such a temperature change is effectively reduced or minimized, assuring accurate measurement of the fluid pressure by the instant sensor.

Various forms of a baffling structure to be positioned adjacent to the diaphragm 10 are specifically disclosed in copending U.S. patent application filed Nov. 7, 1988 claiming the benefit of the filing date of Japanese Patent Application No. 62-301147. Such baffling structures may be used in place of the baffling structure 30, 34.

Figure 5A:
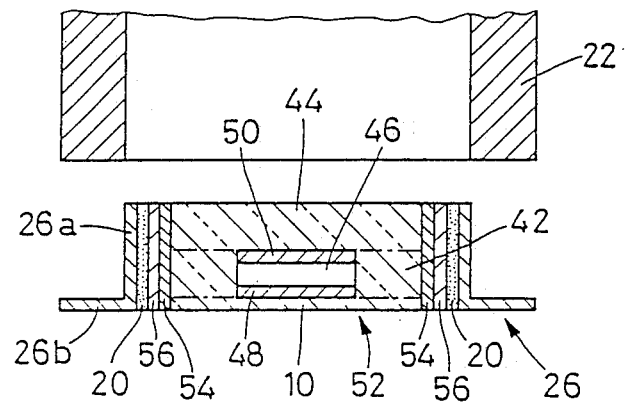
Figure 5B:
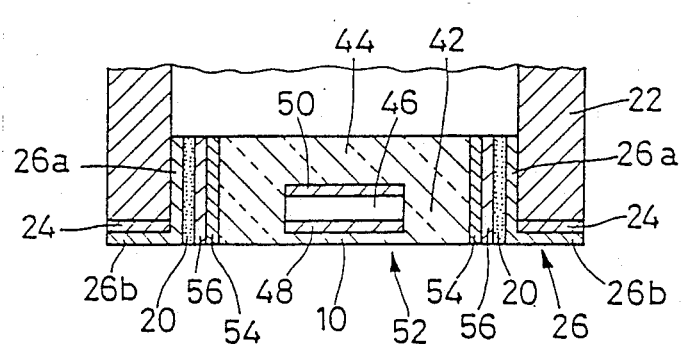

Referring to FIGS. 5(a) and 5(b), there is illustrated a still further embodiment of the pressure sensor of the invention, which employs a ceramic pressure sensing element 52 different from those used in the preceding embodiments. Described more particularly, the ceramic diaphragm 10 is provided integrally with an annular ceramic spacer 42 and a ceramic base 44 in the form of a disk, such that the diaphragm 10 is spaced apart from the base 44 by a distance equal to the thickness of the spacer 42. The ceramic spacer 42 has a central hole which cooperates with the spaced-apart opposite surfaces of the diaphragm 10 and base 44, to define a cavity 46 which communicates with the external space through suitable means or which is fluid-tightly enclosed.

The ceramic spacer 42 and base 44 are formed, by a known technique, of a suitable known ceramic material such as alumina, zirconia, mullite and silicon nitride, as separate unfired masses, or as an integral unfired mass. In the former case, the separate unfired ceramic masses are fired, and the fired ceramic masses are bonded together into the integral ceramic body 10, 42, 44. In the latter case, the integral unfired mass is directly fired into the integral ceramic body 10, 42, 44. From the standpoint of ease of manufacture and durability of the sensor, it is desirable that green sheets corresponding to the diaphragm, spacer and base 10, 42, 44 are superposed on each other into a laminar unfired structure, which is co-fired into the integral ceramic body 10, 42, 44.

On the opposite surfaces of the diaphragm 10 and base 44 which define the thickness or depth of the cavity 46, there are formed a first and a second electrodes 48, 50 integrally with the diaphragm and base 10, 44. These first and second electrodes 48, 50 are formed of a suitable electrically conductive material such as platinum, gold, silver and palladium. Unfired masses of the selected electrically conductive material for the electrodes 48, 50 are applied by printing on the surfaces of the separate fired ceramic bodies 10, 44 before these bodies and the fired spacer 42 are bonded together. Alternatively, the unfired electrically conductive material may be applied to the surfaces of the unfired green sheets for the diaphragm and base 10, 44. The applied masses of the electrically conductive material are fired into the first and second electrodes 48, 50.

Where a metallized layer 54 (which will be described) is formed of tungsten, it is desirable that the first and second electrodes 48, 50 be formed of tungsten, molybdenum or similar material, from the standpoint of a firing atmosphere of the sensing element 52.

The first and second electrode 48, 50 are fixedly positioned within the cavity 46, in mutually spaced-apart and electrically insulated relation with each other. When the diaphragm 10 is stressed and deformed due to a pressure applied thereto, the distance between the two electrodes 8, 50 is changed with an amount of deformation of the diaphragm 10, whereby the electrostatic capacity between the electrodes 48, 50 is accordingly varied. In this way, the amount of strain of the diaphragm 10 and consequently the pressure applied thereto can be detected by measuring the electrostatic capacity of the first and second electrodes 48, 50.

The outer circumferential surface of the thus constructed ceramic pressure sensing element 52 is covered with the metallized layer 54 formed by an ordinary method, and by a plating layer 56 formed on the metallized layer 54. Then, the metallic sealing member 26 is then fitted on the plating layer 56, with the bonding layer 20 of a suitable brazing material formed between the cylindrical portion 26a of the sealing member 26 and the plating layer 56. Thus, the integral assembly 52, 54, 56, 26 is prepared.

The metallized layer 54 and the plating layer 56 are provided to improve the strength of bonding or adhesion between the metallic sealing member 26 and the ceramic pressure sensing element 52 by means of the brazing material 20. These layers 54, 56 are formed by a known technique. For instance, the metallized layer 54 may be formed by: a high-melting-point metallizing method in which a paste formed from a powder of high metaling-point metals such as W, Mo, Ti and Zr and an organic binder is applied to and fired on the relevant surface of the ceramic pressure sensing element 52; a vapor phase method such as physical vapor deposition (PVD) or chemical vapor deposition (CVD) method; and a thick-film method in which a paste formed of a powder of metals such as Au, Ag, Ni and Pt and an organic binder is applied to and fired on the surface of the ceramic sensing element 52

In the present specific example, a paste containing tungsten is applied to the outer circumferential surface of the unfired mass of the ceramic pressure sensing element 52, and is co-fired with the unfired ceramic mass at 1500° C. in a hydrogen gas, whereby the tungsten metallized layer 54 is formed on the surface of the ceramic pressure sensing element 52. Then, the plating layer 56 is formed of Ni by an ordinary plating method. The metallic sealing member 26 is formed from a Kovar sheet (54% of Fe, 29% of Ni and 17% of Co). The sensing element 52 is fitted in the sealing member 26, with a brazing material applied to the inner surface of the cylindrical portion 26a of the sealing member 26. The assembly of the sensing element 52 and the sealing member 26 are heated to 800° C. in a hydrogen gas, whereby the brazing layer 20 is formed to fluid-tightly bond the sensing element 52 and the sealing member 26.

As in the embodiment of FIGS. 2(a) and 2(b), the assembly of the sensing element 52 and the sealing member 26 is welded at the flange portion 26b of the sealing member 26 to the open end face of the metallic housing 22, as indicated at 24, which designates a welding layer.

In the pressure sensor incorporating the pressure sensing element 52 constructed as described above, too, the interior of the metallic housing 22 is fluid-tightly sealed with respect to the external space by the sealing member 26, by means of which the sensing element 52 is fluid-tightly welded to the housing 22, while the sensing element 52 is measuring the pressure of a fluid existing in the external space in the manner as described above. Thus, the instant pressure sensor offers the advantages as described above with respect to the preceding embodiments, and can be suitably used for measuring the pressure within a cylinder bore of an internal combustion engine.

While the several embodiments of the pressure sensor according to the present invention have been described in detail for illustrative purpose only, it is to be understood that the invention is not limited to the details of the illustrated embodiments, but may be embodied with various changes, modifications and improvements, which may occur to those skilled in the art, without departing from the spirit and scope of the invention defined in the following claims.

What is claimed is:

1. A pressure sensor including a cylindrical metallic housing having an open end having an opening, a ceramic pressure sensing element having a ceramic diaphragm and fixedly accommodated within an open end portion of said metallic housing, and strain detecting means associated with said ceramic diaphragm, said ceramic diaphragm being exposed at one of opposite major surfaces thereof to an external space through said opening of the metallic housing and deformable in response to a pressure of a measurement fluid in said external space, an electrical output of said strain detecting means varying with an amount of deformation of said ceramic diaphragm, thereby representing said pressure of the measurement fluid, wherein an improvement comprising:

a metallic sealing member which is fluid-tightly bonded to a peripheral portion of said ceramic pressure sensing element with a bonding material, and which is fluid-tightly welded to said open end portion of said cylindrical metallic housing, so that said pressure sensing element is fluid-tightly secured to said metallic housing through said metallic sealing member, such that an interior of said metallic housing is sealed with respect to said external space.

2. A pressure sensor according to claim 1, wherein said bonding material comprises a glass material.

3. A pressure sensor according to claim 1, wherein said bonding material comprises a brazing material.

4. A pressure sensor according to claim 1, wherein said metallic sealing member comprises an annular plate member having an opening formed therethrough, said one of opposite major surfaces of said ceramic diaphragm being exposed to said external space through said opening of said annular plate member, said annular plate member being bonded to a peripheral portion of said ceramic diaphragm and welded to an end face of said open end of said metallic housing.

5. A pressure sensor according to claim 1, wherein said sealing member comprises a cylindrical portion disposed outwardly of said ceramic sensing element, and a flange portion which extends radially outwardly from said cylindrical portion, said cylindrical portion being bonded to said sensing element while said flange portion being welded to an end face of said open end of said metallic housing.

6. A pressure sensor according to claim 5, wherein said cylindrical portion of said sealing member consists of a double-walled structure.

7. A pressure sensor according to claim 5, wherein said cylindrical portion of said sealing member is bonded to said ceramic sensing element via at least one metal layer.

8. A pressure sensor according to claim 5, wherein said at least one metal layer includes a metallized layer and a metal plating layer.

9. A pressure sensor according to claim 5, further comprising a baffling structure disposed adjacent to said one of opposite major surfaces of said ceramic diaphragm of said ceramic sensing element, said one major surface being exposed to said external space through said baffling structure.

10. A pressure sensor according to claim 9, wherein said baffling structure comprises at least one baffle plate having a plurality of apertures formed therethrough.

11. A pressure sensor according to claim 9, further comprising a covering cap secured to said open end portion of said metallic housing and having an opening formed therethrough, said baffling structure being fixedly accommodated in said covering cap, said one major surface of said ceramic diaphragm being exposed to said external space through said opening of said covering cap as well as through said baffling structure.

* * * * *